METHOD AND APPARATUS FOR COLOR TELEVISION

Filed May 23, 1955 3 Sheets-Sheet 1

MARK E. AMDURSKY
THEODORE S. NOSKOWICZ
CONSTANTIN S. SZEGHO
INVENTORS.

BY John J. Pederson
THEIR ATTORNEY.

METHOD AND APPARATUS FOR COLOR TELEVISION

Filed May 23, 1955 3 Sheets-Sheet 2

MARK E. AMDURSKY
THEODORE S. NOSKOWICZ
CONSTANTIN S. SZEGHO
*INVENTORS.*

*BY* John J. Pederson
THEIR ATTORNEY.

Dec. 9, 1958 M. E. AMDURSKY ET AL 2,864,032

METHOD AND APPARATUS FOR COLOR TELEVISION

Filed May 23, 1955 3 Sheets-Sheet 3

MARK E. AMDURSKY
THEODORE S. NOSKOWICZ
CONSTANTIN S. SZEGHO
*INVENTORS.*

BY John J. Pederson

THEIR ATTORNEY.

2,864,032

METHOD AND APPARATUS FOR COLOR TELEVISION

Mark E. Amdursky, Northbrook, Theodore S. Noskowicz, Wooddale, and Constantin S. Szegho, Chicago, Ill., assignors to Zenith Radio Corporation, a corporation of Delaware Application May 23, 1955, Serial No. 510,186

10 Claims. (Cl. 315—13)

This application is a continuation-in-part of the copending application Serial No. 446,698, filed July 30, 1954, now abandoned.

This invention is directed to a new and improved color television image reproducer of the type adapted for post-deflection-acceleration operation and to a novel method of operating a color television image reproducer to compensate for variations in refraction of the electron beam caused by post-deflection-acceleration operation.

The several different types of image reproducers suitable for color television include two general types of picture tube which are substantially similar in construction. In one image reproducer to which the invention may be applied, a plurality of electron beams are projected through a parallax mask structure to impinge upon a multi-color luminescent target. The electron beams, which may be three in number to correspond to the conventional additive primary colors red, green and blue, are projected toward the screen from individual electron guns and are made to converge approximately in the plane of the masking barrier. Color selection is determined in accordance with the angle at which the beams impinge upon the composite screen-mask target structure, the mask being arranged so that an electron beam approaching from a given angle is permitted to excite only those portions of the screen which emit light of a particular color.

In the second general type of color television image reproducer to which the invention is directed, a single electron beam is projected through a parallax color-selection barrier to impinge upon a multi-color luminescent screen. In this instance color selection is again achieved in accordance with the angle at which the beam impinges upon the mask-screen structure. The single electron beam is periodically deflected to different points of apparent origin in order to excite the various color phosphors of the screen. Both of these two general types of color image reproducer are familiar in the art and may be adequately described as image reproducers which employ parallax color-selection barriers; for a detailed description of the operational characteristics of parallax mask systems, reference may be made to the article "Theory of Parallax Barriers," by S. Kaplan, Journal of the Society of Motion Picture and Television Engineers, vol. 59, July 1952, pp. 11–21.

In both types of image reproducer, the achievement of adequate brightness in the reproduced image presents a difficult problem. Because the receivers in which the tubes are to be employed are usually located in the home, excessive screen voltages or inordinate envelope sizes are highly undesirable. Accordingly, it has been proposed that the parallax color-selection barrier be operated at a potential substantially lower than the potential applied to the luminescent screen so that a beam-focusing field is established between those two elements. By employing this technique, it is possible to make the apertures in the color-selection barrier substantially larger than they would otherwise be so that a much smaller percentage of the electron beam current is intercepted by the barrier.

However, this type of post-deflection-acceleration operation introduces variations in refraction of the electron beam as it scans the color target; these refraction variations, hereinafter referred to as "erection" effects, may lead to substantially greater complexity in the structure of the luminescent screen and may preclude the use of economically feasible screen and barrier manufacturing techniques. At the same time, post-deflection-acceleration operation presents additional problems in maintaining color saturation in the reproduced image due to the presence of excessive amounts of secondary electrons emitted from the parallax barrier or due to primary electrons reflected from either the color barrier or the screen itself.

It is an object of the invention, therefore, to provide a new and improved color television image reproducer which effectively overcomes or minimizes the problems and difficulties of the prior art as set forth above.

It is another object of the invention to provide a new and improved method of compensation for erection effects occuring during post-deflection-acceleration operation of a parallax-mask color television image reproducer.

It is a specific object of the invention to provide a new and improved color television image reproducer and means for operating such an image reproducer to establish within it an effective center of deflection which is closely adjacent to or coincides with the position of a light source employed in manufacturing the luminescent screen of the image reproducer.

It is an additional object of the invention to provide a new and improved parallax-mask color television image reproducer in which compensation for erection effects is accompanied by a substantial improvement in color definition.

It is a corollary object of the invention to provide a new and improved color television image reproducer which may be constructed by the most economical and expeditious techniques available.

A color television image reproducer constructed in accordance with one aspect of the invention comprises electron gun means, including at least one electron-emissive cathode, for effectively projecting a plurality of electron beams through a deflection space along a corresponding plurality of reference paths. The electron gun means may include a plurality of individual electron guns, or a single gun in conjunction with means for dividing the beam developed by that gun on either a spatial or time basis to provide a plurality of effective beams. A multi-color luminescent target is disposed transversely of the reference paths in spaced relation to the electron gun means and a color-selection barrier of the direction-sensitive parallax mask type is disposed transversely of the reference paths intermediate the target and the electron gun means. Means are provided to maintain the color-selection mask at a first predetermined potential positive with respect to the cathode; further means are employed to maintain the luminescent target at a second predetermined potential which is also positive with respect to the cathode and is very much higher than the potential applied to the color-selection barrier whereby electrons in the beams are accelerated and subjected to erection (normalizing lateral deviation) of an amount corresponding, for each of the beams, to a predetermined function of the distance between the point of intersection of each reference path with and the center of the parallax mask during passage from the barrier to the target. Finally, means, including a velocity-determining electrode encompassing substantially all of the portions of the reference paths intermediate the color selection barrier and the deflection space together with means for maintaining the velocity-determining electrode at a potential position with respect to the cathode and higher than the first potential, is provided for subjecting the electrons in each of the beams to de-erection of an amount substantially corresponding to the predetermined function throughout substantially the entire area of the target to compensate for the erection occurring between the barrier and the target.

In its method aspect, the invention is directed to the operation of a color television image reproducer having an electron-optical system comprising electron gun means, including a cathode, for projecting an effective plurality of electron beams through a deflection space along a corresponding plurality of reference paths, a multi-color luminescent target disposed transversely of the reference paths and spaced from the electron gun means, a color-selection barrier disposed across the reference paths between the target and the electron gun means, and a velocity-determining electrode encompassing substantially all of the portions of the reference paths intermediate the color-selection barrier and the deflection space. In accordance with the invention, the color-selection barrier is maintained at a first predetermined positive potential with respect to the cathode (or cathodes) of the tube and the luminescent target is maintained at a second predetermined potential which is positive with respect to the cathode and very much higher than the barrier potential so that an accelerating field is established between the barrier and the target. The velocity-determining electrode is maintained at a positive potential substantially higher than the barrier potential to establish a decelerating field between that electrode and the color-selection mask; this decelerating field is utilized to compensate for erection effects or variations in beam refraction with scanning which are introduced into the electron-optical system of the image reproducer by the accelerating field between the color-selection barrier and luminescent target.

The features of the invention which are believed to be novel are set forth with particularity in the appended claims. The organization and manner of operation of the invention, together with further objects and advantages thereof, may best be understood by reference to the following description taken in conjunction with the accompanying drawings, in which like elements are identified by like numerals in each of the figures, and in which:

Figure 1:
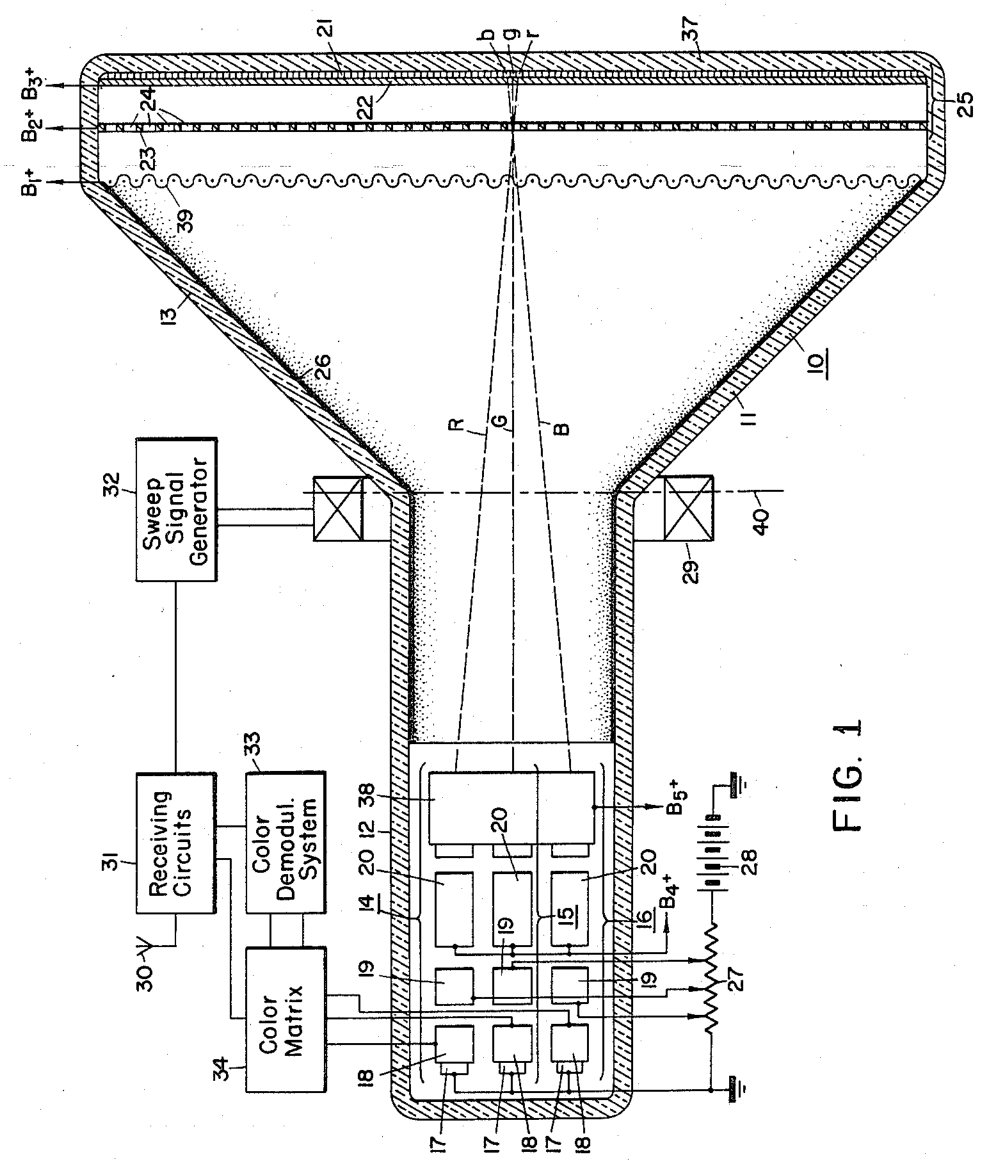
Figure 1 is a cross-sectional view, partly schematic, of one embodiment of a color television image reproducer constructed in accordance with the invention together with a block diagram of illustrative associated receiver circuitry.

The embodiment of the invention illustrated in Figure 1 comprises an image reproducer 10 including an envelope 11 having a neck section 12 and an enlarged bulb or cone section 13. An electron gun assembly comprising three electron guns 14, 15 and 16 is mounted within neck section 12; the individual electron guns may be conventional in construction and may each include a cathode 17, a first control electrode 18, a second control electrode 19, and a focus electrode or first anode 20. The three electron guns may be mounted in parallel alignment with respect to each other in the usual manner and may further include a common convergence electrode 38. Insofar as the present invention is concerned, the particular structure employed for the individual electron guns is not significant and any of the many known types of gun structures available in the art may be employed.

Image reproducer 10 further includes a multi-color luminescent target 21 disposed in spaced relationship to the electron gun means 14, 15 and 16 and preferably mounted closely adjacent to the face-plate 37 of the image reproducer; in the illustrated embodiment, target 21 is formed as a series of elemental color target areas directly deposited on the inner surface of the face-plate. Target 21 may, for example, comprise a series of phosphor strips of elemental width extending in a direction normal to the plane of the drawing; if tri-color reproduction is desired, the strips may comprise phosphors which emit light corresponding to the conventional additive primary colors red, blue and green and may be arranged in a regularly repeating pattern, as indicated by the target area designations *r*, *b* and *g*, respectively. Although a planar construction is shown for target 21, it should be understood that the target may be formed on a spherical or otherwise curved surface if desired. Luminescent target 21 is provided with a thin metallic or other conductive backing film 22 which may be deposited upon the phosphors of the target in conventional fashion. The term "multi-color luminescent target," as employed throughout this specification and in the appended claims, refers to any luminescent target comprising discrete areas which respond to electron bombardment by emitting light of distinctively different colors and in which the phosphor areas of different colors are arranged in a regularly repeating pattern. For example, phosphor strips *r*, *b* and *g* may be made to extend in the vertical direction instead of the horizontal direction indicated in the drawing or elemental dot-type target areas of circular, hexagonal or other configuration may be employed; these alternative types of target construction are all well known in the art. Furthermore, it is not necessary that phosphors which emit light of a particular color be employed; for example, a uniform coating of a white phosphor may be utilized in conjunction with a multi-color filter interposed between the phosphor and the viewing surface or face-plate of the picture tube without departing in any way from the teaching of the invention.

A color-selection barrier comprising a parallax mask 23 is mounted within envelope 10 closely adjacent target 21 and preferably in parallel relationship thereto. Barrier 23 includes a multiplicity of apertures 24 arranged in a pattern which corresponds to the distribution pattern of the individual phosphors on screen 22 so that mask 23 and target 22 constitute a direction-sensitive composite target structure 25 which effectively provides for color selection in accordance with the angle of incidence of an electron beam. Image reproducer 10 also includes a velocity-determining electrode comprising a conductive coating 26 applied to the internal surface of envelope 11 and extending from a point closely adjacent color-selection barrier 23 back into neck section 12 to a point closely adjacent the final electrode 38 of the electron gun assembly. Coating 26 may, for example, comprise a conventional colloidal graphite coating; alternatively, a metallic coating or a separate conductive member may be employed.

Conductive coating 26 is electrically connected to a first source of positive unidirectional operating potential $B_1+$, whereas parallax mask 23 and luminescent target 21 are individually connected to two additional sources of positive operating potential $B_2+$ and $B_3+$. Cathodes 17 are connected to a plane of reference potential, here indicated as ground. Control electrodes 18 are normally maintained at a negative potential with respect to cathodes 17; control electrodes 19 are at a positive potential with respect to the cathodes. Focus electrodes 20 may be electrically connected to each other and to a source of positive potential $B_4+$, whereas the common convergence electrode 21 is connected to an additional operating potential source $B_5+$. Control electrodes 19 are respectively connected to variable taps on a potentiometer represented by a resistor 27 which may be connected in circuit with a source of operating potential, here represented by a battery 28.

A conventional electromagnetic deflection yoke 29 may be employed in conjunction with image reproducer 10 and is preferably mounted at the junction of cone section 13 and neck section 12 of envelope 11; the deflection system location establishes the position of the deflection space of the tube. An electrostatic deflection system may be employed instead of the electromagnetic deflection apparatus if desired, in which case suitable deflection plates may be mounted within envelope 11.

Figure 1 also includes a simplified block diagram of receiver circuitry which may be employed to control the operation of image reproducer 10. This apparatus may comprise an antenna 30 coupled to a receiving circuit unit 31; receiving circuits 31 may, for example, include a suitable radio-frequency amplifier of one or more stages, a first detector, an intermediate-frequency amplifying system of one or more stages, a second detector and a video-frequency amplification system of any desired number of stages. Receiving circuits 31 are coupled to a sweep signal generator 32 which, in turn, is connected to deflection system 29. The receiving circuits are also coupled to a color demodulating system 33 and to a color matrix 34; the color matrix is further coupled to the output stages of the color demodulating system. Color matrix 34 may have three individual output stages individually coupled to control electrodes 18 of electron guns 14, 15 and 16 respectively.

In many respects, the apparatus illustrated in Figure 1 is conventional in form, so that a detailed description of its operation is unnecessary. In brief, a transmitted color television signal is intercepted at an antenna 30 and applied to receiving circuits 31 wherein it is suitably amplified and demodulated in accordance with techniques known in the art. The sweep-synchronizing portions of the received signal are segregated and applied to sweep signal generator 32 wherein they are employed to generate conventional horizontal and vertical sweep signals which are in turn supplied to deflection system 29. The video information portions of the received signal are applied to color demodulating system 33, in which signals representative of the color content of the image to be reproduced are developed. These signals, commonly designated as color difference signals, are supplied to color matrix 34, wherein they are combined with a signal supplied from receiving circuits 31 and representative of brightness and detail of the image to develop three primary color signals which may, for example, correspond to the red, blue and green color content of the image. These circuits may all be conventional in form and operation and may be considered to represent any suitable color television receiver system.

Each of electron guns 14, 15 and 16 develops a stream of electrons which is focused into a beam and projected along a reference path toward target 22. Thus, electron gun 14 projects an electron beam along the reference path indicated by dash line R, whereas guns 15 and 16 project electron beams along reference paths G and B respectively. In this particular embodiment, the three electron beams converge approximately in the plane of color selection barrier 23, convergence being effected by an electrostatic lens established between velocity-determining electrode 26 and the common convergence electrode 38 of the three guns. Alternatively, mechanically converged electron guns may be employed if desired, or convergence may be effected by electromagnetic means at the option of the designer. The operational characteristics of the individual electron guns may be conventional in all respects; for example, the bias potentials applied to control electrodes 18 may be adjusted to compensate for the different efficiencies of the particular phosphors employed for the red, green and blue target areas *r*, *b* and *g* in accordance with familiar techniques. The intensity of each of the electron beams is, of course, modulated in accordance with the primary color signals supplied to control electrodes 18 from color matrix 34 so that the beam from electron gun 14 (for example) varies in intensity in accordance with the red content of the image to be reproduced and the electron beams from guns 15 and 16 are varied in intensity to control the green and blue content of the reproduced image respectively. Apertures 24 of color-selection barrier 23 restrict each of the electron beams according to its angle of incidence upon the barrier so that the beam following path R can impinge only upon target areas *r*, the beam following path G bombards only areas *g*, and the beam proceeding along path B excites only target areas *b*. The three beams are simultaneously deflected across the composite target structure 25 by varying deflection fields produced within the space bounded by system 29 in the usual manner to form an image raster, the plane of deflection being generally indicated by dash line 40.

Figure 2:
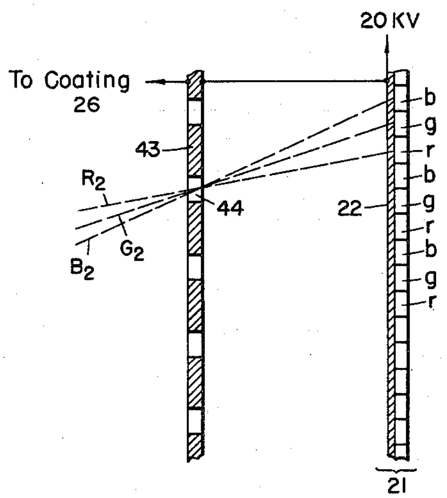
Figure 2 is a cross-sectional view of a portion of the target structure of a conventional parallax mask color image reproducer and is employed to illustrate certain operating characteristics of the device.

As thus far described, the apparatus of Figure 1 is in most respects entirely conventional, the principal difference being that target 21 is ordinarily electrically connected to coating 26 and to color-selection barrier 23, or, for post-deflection-operation, the color-selection barrier may be connected only to the velocity-determining electrode comprising coating 26 with the target being maintained at a much higher potential than the barier. In order to appreciate the full significance of the invention, a brief discussion of the electron-optical characteristics of the conventional types of reproducer is desirable. Figure 2 illustrates, on a greatly expanded scale, a fragmentary portion of the luminescent target and color-selection barrier for a direction-sensitive color target similar to that of Figure 1 but not intended for post-deflection-acceleration operation. Consequently, in this figure the color-selection barrier comprising parallax mask 43 is electrically connected to the conductive backing film 22 of luminescent target 21 so that a field-free space exists between the two electrodes. Conventionally, the color-selection barrier would also be connected to the velocity-determining electrode 26 (Figure 1) of such a device. An individual electron beam following path $R_2$ passes through one of the apertures 44 of mask 43 and continues along a straight line to impinge upon one of the target areas *r*. Similarly, electron beams following paths $G_2$ and $B_2$ proceed undisturbed through the space between the color-selection barrier and the target to excite target areas *g* and *b* respectively. Because there is no potential difference between the target and the parallax barrier, the electron beam paths are not refracted and accurate color reproduction may be achieved. Furthermore, the manufacture of target 21 and/or barrier 43 is relatively simple. Because the electron beam paths effectively constitute uninterrupted straight lines, a master pattern for the manufacture of the luminescent target may be produced by exposing a photographically sensitive plate or film through color-selection barrier 43 by means of a source of light located at a position corresponding to the plane of deflection of the tube, the photographic surface being mounted in position corresponding to that of the tube target. This simple technique is a familiar one in the art and represents an effective and economical method of manufacturing master patterns for the production of color television targets.

Figure 3:
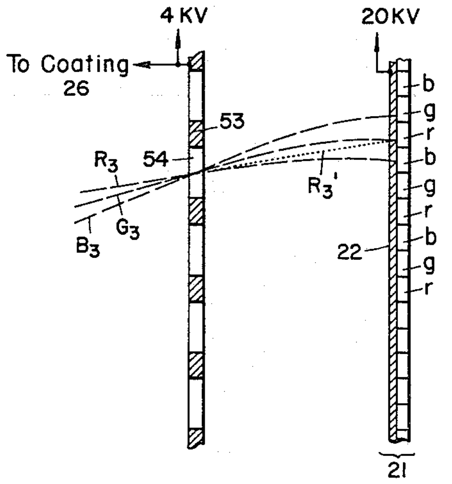
Figure 3 is a view similar to that of Figure 2 except that the effects of post-deflection-acceleration operation are illustrated.

Figure 3 corresponds to Figure 2 except that it represents a portion of the target structure of a direction-sensitive image reproducer constructed for post-deflection-acceleration operation. In such a device, the color-selection barrier 53 is maintained at a first potential positive with respect to the cathode or cathodes of the tube, whereas the target 21 is maintained at an operating potential which is very much higher than that of the color-selection barrier. As a typical example, in a dot-type target structure, the operating potential of luminescent screen 21 may be maintained at approximately 20 kilovolts and the potential applied to color-selection barrier 53 may be of the order of 4 kilovolts so that an accelerating field is established between the color-selection barrier and the luminescent target. At the same time, an electron beam traversing the space between parallax mask 53 and target 21 is subjected to a focusing action; consequently, the apertures 54 in barrier 53 may be made substantially larger than the corresponding apertures in a tube which does not employ post-deflection acceleration (Figure 2). As a result, a substantially higher percentage of the electron beam or beams pass through barrier 53 to impinge upon target 21, so that a considerably brighter image may be reproduced.

Although the post-deflection acceleration structure illustrated in Figure 3 provides a substantially brighter image than may be obtained with corresponding voltages in a uniform-field device such as shown in Figure 2, it also introduces some extremely undesirable effects into operation of the picture tube. For example, secondary electrons emitted from color-selection barrier 53 may be attracted by the target electrode, which is at a much higher potential, and may result in a considerable loss in color definition. Furthermore, the geometrical relationship between the target areas in the luminescent screen and the apertures in the color barrier is substantially changed in a manner which renders manufacture of the luminescent screen much more complex and expensive. The latter effect is graphically illustrated by the electron beam paths $R_3$, $B_3$ and $G_3$, which individually corresponds to beam paths $R_2$, $B_2$ and $G_2$ of Figure 2.

In the usual post-deflection-acceleration tube, barrier 53 is connected to the velocity-determining electrode 26, so that each beam approaches the color-selection barrier along a straight path. Taking beam path $R_3$ as an example, it is seen that a beam following this path, if continued along a straight line, would impinge upon one of the red color target areas *r* as indicated by dotted line $R_3'$. However, due to the accelerating field existing between selection barrier 53 and target 21, the electron beam does not follow the linear path; instead, the beam path in the barrier-target interelectrode space describes a parabola which may, for example, terminate at one of the other types of color target areas. Thus, in the example shown, a beam following path $R_3$ now terminates at one of the blue color target areas *b*.

If this effect were completely uniform throughout the target, it would be unimportant, since it would only require that a different one of the electron guns be employed to excite target areas of a given color. Unfortunately, this is not the case, since the degree of variation from the original straight-line path is entirely dependent upon the angle at which the beam approaches the target structure and is thus dependent upon the instantaneous degree of horizontal and vertical deflection of the beam from the axis of the tube. This phenomenon may be explained by the fact that the accelerating field between the two electrodes has a uniform effect upon that component of beam velocity which is perpendicular to the target but has no effect upon the component of beam velocity parallel to the plane of the target induced by deflecting the beam across the target. Consequently, the beam attempts to approach the target from a direction more nearly perpendicular thereto than in the case of a conventional tube operated without the post-deflection-acceleration field and this erection effect increases with distance from the center of the target, which may be taken as the point at which the electron beam or beams impinge upon the target when undeflected. Consequently, it is no longer possible to make a master pattern for the luminescent target by direct exposure of a photographic plate through the color-selection barrier, and elaborate and difficult techniques must be employed to produce the requisite non-uniform target area distribution required for accurate color reproduction in this type of tube. Alternatively, the target area pattern may be maintained uniform and the aperture pattern of parallax mask 53 may be made non-uniform to compensate for the erection effect, but this expedient is just as complex and difficult as the production of non-uniform luminescent screens.

Figure 4:
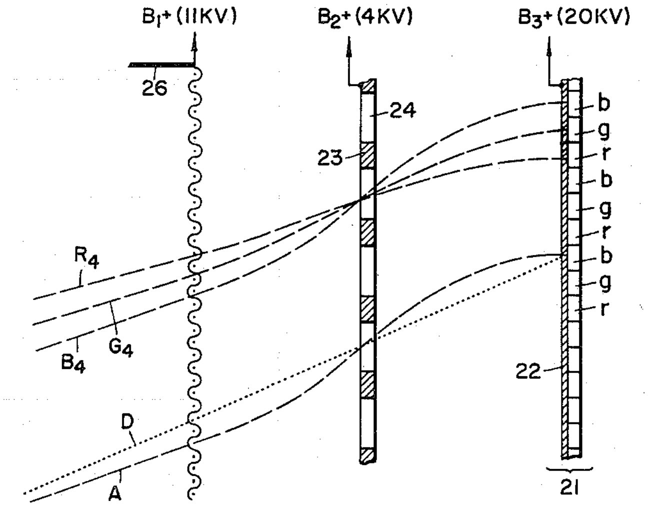
Figure 4 is a cross-sectional view of a portion of the target of the image reproducer of Figure 1, illustrating its operational characteristics.

Figure 4 provides an enlarged view of a portion of image reproducer 10 of the present invention which corresponds to the portions of conventional image reproducers illustrated in Figures 2 and 3. As indicated in the foregoing description of tube 10, color-selection barrier 23 is maintained at a predetermined positive potential with respect to the cathodes of the tube by means of its connection to operating voltage source $B_2+$. Target 21 is operated at a positive potential very much higher than that of the color-selection barrier by means of the connection to source $B_3+$ and the velocity-determining electrode comprising coating 26 is maintained at a potential intermediate that of the barrier and the luminescent target by means of the connection to D. C. source $B_1+$. By way of illustration, the operating voltages of the velocity-determining electrode, the color-selection carrier, and the luminescent target may be maintained at approximately 11 kilovolts, 4 kilovolts, and 20 kilovolts respectively. Consequently, an accelerating field is established between the color-selection barrier and the target electrode, as was the case in the apparatus illustrated in Figure 3. At the same time, however, a decelerating field is established between the velocity-determining electrode and the color-selection barrier.

An electron beam approaching the target along path $R_4$, which corresponds to beam paths $R_2$ and $R_3$ of Figures 2 and 3 respectively, first encounters the decelerating field between the velocity-determining electrode 26 and color-selection barrier 23. The component of velocity perpendicular to the color-selection barrier is affected by the decelerating field, so that the beam describes an upwardly directed parabolic path as it approaches the color-selection barrier. After passing through the barrier 23, the beam is subjected to an accelerating field and consequently describes a parabolic path which is curved in the opposite sense as it traverses the space between electrodes 21 and 23. Each of the other two beam paths $G_4$ and $B_4$ are similarly affected. The decelerating field between electrodes 23 and 26 thus compensates for the erection effect introduced by the accelerating field between the color barrier and the target so that the electron beams again impinge upon the desired color target areas; the beam following path $R_4$ excites target areas *r* and beams $G_4$ and $B_4$ impinge target areas *g* and *b* respectively. Of course, the voltages applied to electrodes 23 and 26 to achieve the desired coincidence between electronic and optical color centers are dependent upon the spacing between these electrodes and the spacing between barrier 23 and screen 21; the precise voltage ratios required for given tube dimensions may be readily determined by theoretical or by empirical methods.

A representative beam path A, which corresponds to path $B_4$, has been separately illustrated in Figure 4 to permit comparison with the straight line path D which an electron beam would follow if the velocity-determining electrode, color barrier, and target were all maintained at the same potential; thus, beam path D corresponds to path $B_2$ of Figure 2. It is seen that the two paths are not coincident but are convergent, so that they must intersect at some point of common origin. Path A is representative of a multiplicity of electron beam paths, having a common origin at an electronic color center, for an electron beam employed to energize the blue-emitting portions *b* of color target 21. Line D, on the other hand, if extended, is representative of a similar multiplicity of light paths having a common origin or optical color center from which a photographic plate may be exposed through selection barrier 23 to produce a master pattern representative of the color areas of target 21. So long as the two groups of paths have closely adjacent origins, it is possible to employ simple photographic techniques for the production of a master target pattern or for the direct manufacture of the target color areas. Consequently, the manufacture of image reproducer 10, of which Figure 4 represents a portion, may be effected by the same relatively simple and economical techniques employed to produce the conventional constant-field device described in connection with Figure 2.

At the same time, image reproducer 10 possesses distinct operational advantages as compared to either of the devices described and discussed in connection with Figures 2 and 3. For example, substantially brighter pictures may be produced than are possible with the constant-field device of Figure 2 using corresponding screen voltages. The relatively higher-velocity electron beam provides better focus upon the screen than may be realized with the conventional post-deflection-acceleration technique described in connection with Figure 3; moreover, the stiffer electron beam is less subject to extraneous field such as the earth's magnetic field or the fields from high voltage transformers and other receiver apparatus. Secondary electron effects are substantially reduced, since many of the secondaries are collected by the velocity-determining electrode 26.

In order to realize the advantages of the invention to the fullest extent, the decelerating field between velocity-determining electrode 26 and color-selection barrier 23 should be made as uniform as possible. For this purpose, it is preferred that a conductive mesh 39 be mounted within tube 10 to extend across the beam paths in parallel spaced relation to color-selection barrier 23, as illustrated in Figure 1. The conductive mesh is electrically connected to coating 26 so that these two elements in effect comprise a single field-compensation electrode. In addition, the composite coating-mesh structure is more effective as a collector for secondary electrons, so that dilution of the image colors is more effectively minimized.

The relative voltages applied to the target, the color-selection barrier, and the erection-field-compensation electrode represented by coating 26 or the combination of that coating and mesh 39 are preferably selected so that the optical color center and the electron color center of the image reproducer are located in the deflection plane represented by line 40 in Figure 1. Under these conditions, exposure of a master pattern for the luminescent target or of the target itself in direct photographic processes may be effected by light sources located at the same distance from the color-selection barrier as the deflection plane, which facilitates standardization of manufacturing fixtures. The particular voltage selected for the compensation electrode is, of course, dependent upon the geometry of the tube structure and particularly on the spacing between that electrode and barrier 23 and the spacing between the color-selection barrier and target 21. Then too, the potential selected for $B_1+$ is to some extent determined by the potential difference between $B_2+$ and $B_3+$, since $B_1+$ must be high enough to provide effective compensation so that lines D and A intersect at some point in deflection plane 40.

There are certain critical voltage relationships which must be maintained in order to achieve satisfactory operation in a color image reproducer constructed and operated in accordance with the invention. The first critical relationship is presented by the ratio of the voltage applied to field-compensation electrode 26, 39 to the operating potential of parallax mask 24. Desaturation effects due to secondary emission from the parallax mask could be eliminated completely if the mask were operated at or near cathode potential. This type of operation would be possible and even highly desirable in a tube in which the angle of incidence of the beam upon the color-selection barrier is immaterial, as in the case of some devices utilizing beams which always impinge upon the color-selection barrier at an angle of 90°; however, this type of operation is not possible in a direction-sensitive structure of the parallax mask type. In tubes constructed in accordance with the invention, using parallax-type color-selection barriers, if the barrier is maintained at or near cathode potential, the horizontal component of velocity of the electron beam decreases with increased scanning angles and soon becomes too small to permit the beam electrons to pass through the mask; as a consequence, some or all of the electrons of the beam are reflected back toward the electron guns and the tube becomes inoperable. It can be shown mathematically that the maximum deflection angle obtainable in image reproducer 10 may be expressed as:

$$\text{(1)} \qquad \text{Sin } \theta = \left[\frac{B_2+}{B_1+}\right]^{\frac{1}{2}}$$

where $\theta$ is the maximum deflection angle. Consequently, the voltage ratio between potential $B_1+$ and voltage $B_2+$ cannot be made greater than 10:1 if reasonably large scanning angles are to be employed and should preferably be 6:1 or smaller. The 10:1 ratio provides a maximum scanning angle of 12.6° from the normal to barrier 24, which is a very small scanning angle indeed according to modern practice. At the same time, however, the voltage ratio $B_1+:B_2+$ must be maintained greater than 2:1 in order to obtain adequate focusing in the image reproducer.

In order to provide a concrete illustration of the dimensions and operating potentials which may be employed in a color image reproducer constructed in accordance with the invention, operational and structural data for a satisfactory tube using a dot-type planar target mounted within a 24" metal rectangular envelope is presented below. This material is presented purely by way of illustration and in no sense by way of limitation upon the invention.

| | | |
|---|---|---|
| Picture height | inches | 18¼ |
| Picture width | do | 13¼ |
| Maximum deflection angle (diagonal) | degrees | 62 |
| Spacing, mask **24** to target **21** | inches | 0.416 |
| Spacing, mask **24** to mesh **39** | do | 0.375 |
| Spacing, deflection center **40** to mesh **39** | do | 14.8 |
| Parallax mask aperture diameter | do | 0.018 |
| Parallax mask aperture spacing (center to center) | inches | 0.023 |
| Phosphor dot diameter | do | 0.014 |
| $B_1+$ | kilovolts | 10.5 |
| $B_2+$ | do | 4.7 |
| $B_3+$ | do | 20 |

This particular image reproducer has an electron transmission factor of approximately 40%, which is about three to four times greater than that which may be obtained with a conventional parallax-mask tube of the type discussed in connection with Figure 2, thus providing a very material increase in brightness. In color pictures, using this image reproducer, highlight brightnesses of 60 foot lamberts have been measured. Furthermore, measurements on this particular tube indicate that secondary electrons emitted from mask 24 and impinging upon target 21, 22 are reduced by about 7:1 as compared to image reproducers of the conventional post-deflection-acceleration type described in connection with Figure 3, thereby substantially improving color saturation in the reproduced image. No moiré due to the presence of auxiliary electrode 39 was observed on a blank raster or in monochrome or color pictures.

Figure 5:
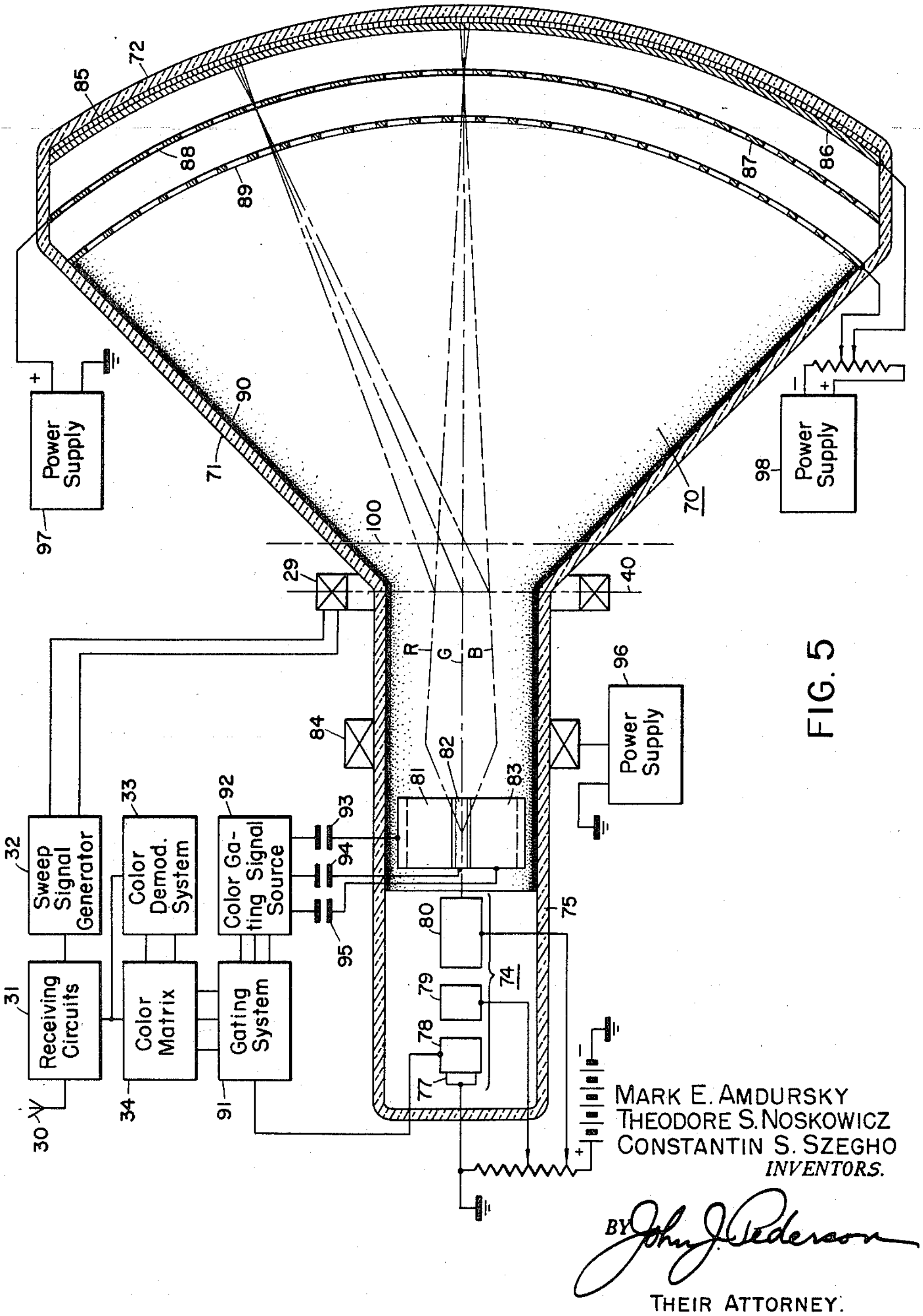
Figure 5 illustrates a preferred embodiment of the invention in a view corresponding to that of Figure 1.

Figure 5 illustrates a preferred embodiment of the invention in which the luminescent target of the tube is deposited upon a concave curved surface. This embodiment comprises an image reproducer 70 including an envelope 71 having a curved, preferably spherical, faceplate 72. A single electron gun 74 is mounted within the neck section 75 of envelope 71; the electron gun may be of conventional construction and may include a cathode 77, a control electrode 78, a first focus electrode or anode 79, and a second anode 80. Anode 80 is followed by three color deflection electrodes 81, 82 and 83 disposed in encompassing relation to the path of the electron beam developed by gun 74. As in the previous embodiment, a conventional electromagnetic deflection yoke 29 is mounted on envelope 71 and, in this embodiment, an electromagnetic convergence system 84 is mounted on neck section 75 intermediate deflection yoke 29 and electrode system 81—83.

Image reproducer 70 also comprises a multi-color luminescent target 85 deposited upon the internal concave surface of faceplate 72; target 85 may be essentially similar to target 21 (Figure 1) and preferably comprises a multiplicity of minute dots of phosphor material distributed in a predetermined pattern throughout the faceplate surface. Target 85 is provided with the usual conductive backing layer 86 which may comprise a film of aluminum or other suitable material. The picture tube further includes a parallax-mask color-selection barrier 87 including a multiplicity of lens apertures 88; barrier 87 is substantially similar in construction to mask 23 of the previously-described embodiment and preferably has a configuration substantially similar to that of faceplate 72. An auxiliary apertured electrode 89, preferably in the form of a wire mesh screen also of curved configuration, is interposed between mask 87 and electron gun 74; electrode 89 is electrically connected to the internal conductive coating 90 of tube 70 to form a velocity-determining electrode extending from electrode 89 back to gun 74. Much of the circuitry for tube 70 may be substantially similar to that described in connection with tube 10 of Figure 1; for example, a color receiver using tube 70 may include antenna 30 coupled to receiving circuits 31 which, in turn, are coupled to sweep generator 32, color matrix 34, and color demodulating system 33 in the same manner as described in connection with Figure 1. In this embodiment, the three output circuits of color matrix 34 are coupled to control electrode 78 of the image reproducer through a gating system 91 which is also coupled to a color-gating signal source 92. Gating signal source 92 is also coupled to deflection electrodes 81, 82 and 83 by means of three coupling capacitors 93, 94 and 95 respectively. Convergence system 84 is provided with a power supply 96; separate D. C. power supplies 97 and 98 are provided for mask 87 and luminescent target 85, 86 respectively. Conductive coating 90 and auxiliary 89 are also connected to power supply 98.

When image reproducer 70 is placed in operation, a color telecast is intercepted, as in the previous embodiment, by antenna 30 and is suitably amplified and detected in receiving circuits 31. The usual sweep signals are generated in circuit 32 under the control of synchronizing information included in the received signal; the sweep signals are applied to deflection yoke 29 to provide the necessary scanning action in the image reproducer. The detected signal is also supplied to color demodulator 33 to develop suitable color-difference signals which are combined in color matrix 34 with luminance information to develop three primary color signals. These three primary color signals are supplied in time sequence to control electrode 78 of the picture tube, the gating sequence being controlled by gating system 91 in response to suitable signals developed in circuit 92.

Electron gun 74 develops a beam of electrons which is projected through color deflection system 81—83. Suitable deflection signals are applied to the deflection electrodes from gating signal source 92 to deflect the electron beam to three different paths in the same time sequence as employed in supplying color information to the control electrode. Thus, electrode system 81—83 effectively deflects the electron beam to form three different beams on a time-division basis. Magnetic convergence system 84 is energized from power supply 96 to establish a magnetic convergence field and redirect the three effective electron beams along reference paths R, G and B which converge approximately at color-selection barrier 87. As the electron beams approach the multicolor luminescent target 85, they are first subjected to a decelerating field in the space between the velocity-determining electrode 89, 90 and mask 87; the beams are subsequently accelerated as they traverse the space between the parallax mask and target coating 86. The decelerating and accelerating fields are, of course, established by the relative potentials applied to field-compensation electrode 89, 90, color-selection barrier 87 and screen coating 86 from power supplies 97 and 98.

The curved configuration of luminescent target 85, mask 87, and electrode 89 provides distinct advantages insofar as the operation of this embodiment of the invention is concerned, particularly when these elements are substantially spherical in shape. Even though it is not usually desirable to use a screen configuration having a center of curvature in the plane of electronic color centers, indicated by dash line 40, since the angle of view would be somewhat restricted by such a bulbous structure, the use of a curved target structure substantially reduces the refraction effects produced by the accelerating field between mask 87 and target coating 86. Consequently, the luminescent target and the velocity-determining or field-compensation electrodes of tube 70 may be operated at substantially equal potentials, thus greatly simplifying the power-supply circuitry of the image reproducer. For complete compensation for erection effects, compensation electrode 89, 90 must still be operated at a somewhat lower potential than the target. However, it has been determined that satisfactory operation may be obtained in spherical-target tubes by establishing the velocity-determining electrode at the same potential as the target or even at a very slightly higher potential; in the latter instance, collection of secondary electrons is even better than in the embodiment of Figure 1 and desaturation difficulties from this source are entirely eliminated.

For image reproducers in which these two electrodes are to be maintained at approximately equal potentials, the optical color center plane used in manufacturing color target 85 is spaced from the color target by a distance slightly smaller than the spacing between the target and deflection plane 40, as indicated by dash line 100. Usually, the optical color center plane is spaced from the color target by a distance equal to 75 to 95 percent of the deflection center to screen spacing; for a tube of given dimensions, this spacing may be easily determined by empirical methods. In tubes of this type, utilizing conventional envelopes, satisfactory operation may be obtained by maintaining the target and field-compensation electrodes at a potential of 20 kilovolts with mask 87 established at a potential of approximately five kilovolts. As in the previous embodiment, however, in order to obtain effective operation with substantial scanning-deflection angles, the voltage ratio between the field-compensation potential and the mask potential must be within the range from 10:1 to 2:1.

While particular embodiments of the present invention have been shown and described, it is apparent that changes and modifications may be made without departing from the invention in its broader aspects. The aim of the appended claims, therefore, is to cover all such changes and modifications as fall within the true spirit and scope of the invention.

We claim:

1. A color television image reproducer comprising: electron gun means, including electron-emissive cathode means, for projecting a plurality of electron beams through a common deflection space along a corresponding plurality of reference paths; a multi-color luminescent target disposed transversely of said reference paths in spaced relation to said electron gun means; a direction-sensitive color-selection barrier comprising a parallax mask disposed transversely of said reference paths intermediate said target and said electron gun means to form with said luminescent target, a direction-sensitive composite target structure; a field-compensation electrode encompassing substantially all of the portions of said reference paths intermediate said color-selection barrier and said deflection space; means for maintaining said color-selection barrier at a first predetermined potential positive with respect to said cathode means; means for maintaining said luminescent target at a second predetermined potential positive with respect to said cathode means, said second potential being very much higher than said first potential; and means for maintaining said field-compensation electrode at a third predetermined potential at least double said first potential and less than said second potential and of a magnitude to establish an effective electronic color center for said image reproducer which corresponds to the optical color center thereof.

2. A color television image reproducer comprising: electron gun means, including an electron-emissive cathode, for effectively projecting a plurality of electron beams through a deflection space along a corresponding plurality of reference paths; a direction-sensitive color-selection barrier comprising a parallax mask disposed transversely of said reference paths in spaced relation to said electron gun means, said barrier having a multiplicity of lens apertures distributed in a predetermined pattern throughout its area; a luminescent target, disposed transversely of said reference paths in spaced relation to said color-selection barrier on the side thereof opposite said electron gun means, said target including a plurality of groups of color target areas interspersed with each other in distribution patterns corresponding to barrier aperture pattern, said group distribution patterns each being established by direct projection through said barrier apertures from a corresponding plurality of optical color centers located in a common plane intermediate said electron gun means and said barrier; a velocity-determining electrode encompassing substantially all of said reference paths intermediate said color-selection barrier and said deflection space; means for maintaining said color-selection barrier at a first predetermined potential positive with respect to said cathode; and means for maintaining said target and said velocity-determining electrode at predetermined potentials at least double said first potential to establish a corresponding plurality of effective electronic color centers in a common plane within said deflection space and spaced from said color-selection barrier by a distance at least as great as the distance separating said barrier from said optical color center plane.

3. A color television image reproducer comprising: electron gun means, including an electron-emissive cathode, for effectively projecting a plurality of electron beams through a deflection space along a corresponding plurality of reference paths; a direction-sensitive color-selection barrier comprising a concave conductive parallax mask disposed transversely of said reference paths in spaced relation to said electron gun means, said barrier having a multiplicity of lens apertures distributed in a predetermined pattern throughout its area; a luminescent target, disposed upon a concave surface extending transversely of said reference paths in spaced relation to said color-selection barrier on the side thereof opposite said electron gun means, said target including a plurality of groups of color target areas interspersed with each other in distribution patterns corresponding to said barrier aperture pattern, said distribution patterns being established by direct projection through said barrier apertures from a corresponding plurality of optical color centers located in a common plane intermediate said electron gun means and said barrier; a velocity-determining electrode encompassing substantially all of said reference paths intermediate said color-selection barrier and said deflection space; means for maintaining said color-selection barrier at a first predetermined potential positive with respect to said cathode; and means for maintaining said target and said velocity-determining electrode at substantially equal predetermined potentials at least double said first potential to establish a corresponding plurality of effective electronic color centers in a common plane within said deflection space and spaced from said color-selection barrier by a distance at least as great as the distance separating said barrier from said optical color center plane.

4. A color television image reproducer comprising: electron gun means, including an electron-emissive cathode, for effectively projecting a plurality of electron beams through a deflection space along a corresponding plurality of reference paths; a multi-color luminescent target disposed transversely of said reference paths in spaced relation to said electron gun means; a color-selection barrier comprising a direction-sensitive parallax mask disposed transversely of said reference paths intermediate said target and said electron gun means; means for maintaining said color-selection barrier at a first predetermined potential positive with respect to said cathode; means for maintaining said luminescent target at a second predetermined potential positive with respect to said cathode and higher than said first potential, whereby, during passage from said barrier to said target, electrons in said beams are accelerated and subjected to lateral deviation in a predetermined sense and of an amount corresponding, for each of said beams, to a predetermined function of the distance between the point of intersection of each reference path with and the center of said parallax mask; means, including a velocity-determining electrode encompassing substantially all of the portions of said reference paths intermediate said color-selection barrier and said deflection space and means for maintaining said velocity-determining electrode at a potential positive with respect to said cathode and at least double said first potential, for subjecting said electrons in each of said beams to lateral deviation of a sense opposite to that of and of an amount substantially corresponding to said predetermined function throughout substantially the entire area of said luminescent target to compensate for said deviation occurring between said barrier and target.

5. A color television image reproducer as defined in claim 4, in which said subjecting means includes additional electrode means disposed between said velocity-determining electrode and said parallax mask for substantially optimizing correspondence of said opposite-sense lateral deviation amount with said predetermined function over said entire area.

6. A color television image reproducer as defined in claim 5, in which said subjecting means includes means for maintaining said additional electrode means and one of said electrodes at a common potential.

7. The color image reproducer as defined in claim 6, in which said potential of said velocity-determining electrode is substantially equal to said second predetermined potential.

8. A color television image reproducer as defined in claim 4, in which said additional electrode means comprises a conductive mesh disposed transversely of said reference paths and electrically connected directly to said velocity-determining electrode.

9. A color television image reproducer comprising: electron gun means, including an electron-emissive cathode, for effectively projecting a plurality of electron beams through a deflection space along a corresponding plurality of reference paths; a multi-color luminescent target disposed transversely of said reference paths in spaced relation to said electron gun means; a color-selection barrier comprising a direction-sensitive parallax mask disposed transversely of said reference paths intermediate said target and said electron gun means; deflection means for varying the angles of each of said reference paths from an axis of said tube normal to the center of said target and in accordance with a predetermined function to scan substantially the entire area of said target with said beams; means for maintaining said color-selection barrier at a first predetermined potential positive with respect to said cathode; means for maintaining said luminescent target at a second predetermined potential positive with respect to said cathode and higher than said first potential, whereby, during passage from said barrier to said target, electrons in each of said beams are accelerated and subjected to erection of an amount proportional to the size of the corresponding angle of deflection; means, including a velocity-determining electrode encompassing substantially all of the portions of said reference paths intermediate said color-selection barrier and said deflection space and means for maintaining said velocity-determining electrode at a potential positive with respect to said cathode and at least double said first potential, for subjecting said electrons in each of said beams to de-erection of an amount proportional to the size of the corresponding angle of deflection to compensate for said erection occurring between said carrier and target.

10. A color television image reproducer comprising: electron gun means, including an electron-emissive cathode, for effectively projecting a plurality of electron beams through a deflection space along a corresponding plurality of reference paths; a color-selection barrier electrode comprising a direction-sensitive parallax mask disposed transversely of said reference paths in spaced relation to said electron gun means, said barrier having a multiplicity of lens apertures distributed in a predetermined pattern throughout its area; a luminescent target, disposed transversely of said reference paths in spaced relation to said color-selection barrier on the side thereof opposite said electron gun means, said target including a plurality of groups of color target areas interspersed with each other in distribution patterns corresponding to said barrier aperture pattern, said group distribution patterns each being established by direct projection through said barrier apertures from a corresponding plurality of optical color centers located in a common plane intermediate said electron gun means and said barrier; a velocity-determining electrode encompassing substantially all of said reference paths intermediate said color-selection barrier and said deflection space; means for maintaining said color-selection barrier electrode at a first predetermined potential positive with respect to said cathode; means for maintaining said target at a second predetermined potential substantially higher than said first predetermined potential; additional electrode means disposed between said velocity-determining electrode and said parallax mask for controlling field distribution between said velocity-determining electrode and said mask; and means, including means for maintaining said velocity-determining electrode at a potential at least double said first predetermined potential and means for maintaining said additional electrode means and one of said electrodes at a common potential, for establishing a corresponding plurality of effective electronic color centers in a common plane within said deflection space.

References Cited in the file of this patent

UNITED STATES PATENTS

| | | |
|---|---|---|
| Re. 23,838 | Rajchman | June 8, 1954 |
| 2,692,532 | Lawrence | Oct. 26, 1954 |
| 2,714,688 | Reed | Aug. 2, 1955 |
| 2,728,024 | Ramberg | Dec. 20, 1955 |
| 2,728,872 | Smith | Dec. 27, 1955 |
| 2,734,146 | Noskowicz | Feb. 7, 1956 |
| 2,755,410 | Schlesinger | July 17, 1956 |
| 2,783,413 | Smith | Feb. 26, 1957 |